United States Patent
Lavens

(10) Patent No.: US 8,061,489 B1
(45) Date of Patent: Nov. 22, 2011

(54) APPARATUS FOR CONTROLLING MOVEMENT OF FOUR-WHEEL TRAILER

(75) Inventor: Charles A. Lavens, Oglesby, IL (US)

(73) Assignee: Cal Manufacturing, Inc., Oglesby, IL (US)

( * ) Notice: Subject to any disclaimer, the term of this patent is extended or adjusted under 35 U.S.C. 154(b) by 0 days.

(21) Appl. No.: 12/912,585

(22) Filed: Oct. 26, 2010

(51) Int. Cl.
*B60T 7/20* (2006.01)

(52) U.S. Cl. .................................. 188/112 R

(58) Field of Classification Search ............... 280/426, 280/442, 443, 444, 445; 188/112 R, 120
See application file for complete search history.

(56) References Cited

U.S. PATENT DOCUMENTS

| | | | |
|---|---|---|---|
| 564,669 A | 7/1896 | Walton | |
| 645,158 A | 3/1900 | Windle | |
| 896,391 A | 8/1908 | Kanke | |
| 954,229 A | 4/1910 | Turner | |
| 997,959 A | 7/1911 | Brigel | |
| 1,020,851 A | 3/1912 | Spires | |
| 1,318,602 A * | 10/1919 | Lathers | 188/120 |
| 1,824,554 A * | 9/1931 | Lathers | 188/112 R |
| 1,879,981 A * | 9/1932 | Hamilton | 188/112 R |
| 2,435,255 A | 2/1948 | Watson | |
| 2,562,280 A * | 7/1951 | Mayhew | 188/112 R |
| 4,807,899 A | 2/1989 | Belcher | |
| 5,005,852 A | 4/1991 | Smyly, Sr. | |
| 5,009,445 A | 4/1991 | Williams, Jr. | |
| 5,048,854 A | 9/1991 | Clark | |
| 5,085,408 A | 2/1992 | Norton et al. | |
| 5,938,227 A | 8/1999 | Hills | |
| 6,193,258 B1 | 2/2001 | Kennedy | |
| 7,290,755 B1 | 11/2007 | Thibodeaux | |
| 7,503,195 B2 | 3/2009 | Vegvary | |
| 2007/0108731 A1 | 5/2007 | McBroom | |

FOREIGN PATENT DOCUMENTS

WO   WO 93/17886   9/1993

* cited by examiner

*Primary Examiner* — Kevin Hurley

(57) ABSTRACT

An apparatus for controlling movement of a trailer to permit pulling it behind a tow vehicle is disclosed. Mechanical sub-assemblies can be combined to provide a trailer that can be either guided to a tow vehicle by a winch or simply pulled along behind a tow vehicle at intervals. Thus, the apparatus is constructed and arranged to facilitate guidance to lead the trailer coupler to the tow ball for hitching in the conventional fashion, and is also constructed and arranged to provide a safe, convenient, hands-off approach to pulling the trailer behind the tow vehicle from one position in the field to another without hitching the coupler to the tow bar.

4 Claims, 7 Drawing Sheets

APPARATUS FOR CONTROLLING MOVEMENT OF FOUR-WHEEL TRAILER

FIELD OF THE INVENTION

An apparatus for controlling the movement of a four-wheel trailer while pulling it behind a tow vehicle is disclosed. In a most preferred embodiment, the four-wheel trailer can be adapted to be used in farming, in which the trailer can be pulled behind a tow vehicle by a cable, rather than coupling it in the conventional fashion, so that its movement can be more readily controlled so as to be used in conjunction with field equipment.

In a most preferred embodiment, a combination of subassemblies combine to provide a trailer that can be either guided to a tow vehicle by a winch or simply pulled along behind a tow vehicle at intervals. If provided, the winch is mounted on the back of the tow vehicle and centrally located thereon, positioned above a trailer hitch connection provided either by a pin aperture or a tow ball. As thus configured, the apparatus facilitates guidance to lead the trailer drawbar to the tow vehicle for hitching in a conventional fashion, and is also constructed and arranged to provide a safe, convenient, hands-off approach to pulling the trailer behind the tow vehicle from one position in the field to another without hitching the drawbar to the tow vehicle.

In an even more preferred embodiment, the trailer is provided with a dampening subassembly to absorb some of the shock of sudden movement of the tow vehicle relative to the trailer, to avoid undue wear and tear on the system components. The trailer is further is yet further provided with a biased-on braking subassembly so that the trailer can be left relatively unattended or moved reliably to interval positions behind the tow vehicle without risk of unintended movement. In this fashion, the trailer can be towed for discrete intervals without coupling it to the tow vehicle, and left relatively unattended during such movement. The trailer subassembly is further provided with a brake release securement to permit maintaining the biased-on brake subassembly in a released position. In this fashion, the trailer can be towed without fear that the brake subassembly will be engaged, thus impeding towing.

BACKGROUND OF THE INVENTION

Thus, there is need for a four-wheel trailer that can be pulled behind a tow vehicle without coupling it to the tow vehicle in the conventional fashion, guided to the tow vehicle as desired, and usable in the field without undue threat of unintended movement.

The following U.S. patents and published applications illustrate the efforts of others to address the problems identified and solved by the disclosure herein.

U.S. Pat. No. 7,503,195 discloses a wheel lock for a trailer. The wheel lock has at least one tooth moveable between a first position, against the tire, and a second position, remote therefrom. In this fashion, in the first position, the tooth is oriented to substantially prevent forward rotation of the tire by engaging the tire, while in the second position, the tire is free to rotate.

U.S. Pat. No. 7,290,755 discloses an integrated, self-contained, retrieving trailer hitch assembly for use in coupling trailers to large SUVs and RVs. The self-contained module is plugged directly into a vehicle tow bar hitch receiver and connected to the vehicle's electrical power supply. The module-retrieving hitch contains an integral, retracting take-up reel with a cable extending through a docking housing and connected to an extendable docking guide member. The docking member may be adapted for removable connection to a ball hitch assembly generally used for insertion within vehicle tow bar receivers. The docking guide member automatically locks the guide member within the docking housing upon docking. An interlock is provided for unlocking the docking member.

U.S. Pat. No. 6,193,258 discloses a device for aligning the trailer hitch ball on the towing vehicle, and for lifting the trailer hitch on and off the ball. The device comprises a swiveling vertical post assembly in close proximity to the hitch ball. The swiveling vertical post assembly pivots at its attachment point with the towing vehicle, thereby allowing the user to load or unload a trailer from the vehicle even when the trailer is not perfectly aligned directly behind the vehicle. The swiveling vertical post assembly has a pivotal arm which can be moved from an upper pivot point position to a lower pivot point position. In both the upper position and the lower position, the pivotal arm is allowed to rotate from a generally vertical position to a rearwardly inclined position in order to provide a moving cable guide that helps determine the location and direction of movement of the cable and hence the forces exerted on the tongue end. The stationary post has a lower cable receiver for receiving a cable connected to a winch on the tongue of the trailer. Once the cable is anchored to the receiver, operation of the winch creates forces which move the tongue and socket relative to the hitch ball and also pivot the pivoting arm to redirect the direction of the cable and, hence, the socket. The apparatus can be operated two ways: 1) on-loading the trailer hitch onto the ball; and, 2) off-loading the trailer hitch from the ball. Each of these modes of operation has two further modes of operation: (a) when the vehicle is at a higher elevation than the trailer; and (b) when the trailer is at a higher elevation than the vehicle.

U.S. Pat. No. 5,938,227 discloses a winch driven cable guidance system for coupling trailers to tow vehicles. A trailer having a trailer hitch coupler is provided. A horizontal roller, a tow vehicle having a coupling ball joint, a winch mounted on the tow vehicle, a coupling ball mounted on the bumper of the tow vehicle, and a series of pulleys are provided. A spring, a cable fitted with an end connection, and cable guiding pulleys are positioned wherein the winch powers the cable drum to reel in the cable and the attached trailer. This assists in connecting the trailer to the towing vehicle, thus effecting a universal joint between the trailer and towing vehicle.

U.S. Pat. No. 5,085,408 discloses a trailer connecting guide for use with a trailer. The trailer connecting guide is attached to one side of the tongue of the trailer and is operable to guide the trailer sufficiently close to the tow vehicle to complete the connection. The trailer connecting guide assembly includes a pulley, a mounting bolt, and a winch cable guide. The cable guide is mounted between the pulley and trailer tongue and includes at least one elongated slot adjacent to the pulley track which restricts the movement of the winch cable with respect to the pulley track so as to prevent the winch cable from pumping out of the pulley track. In operation, a length of cable is first let off the winch and the end of the winch cable is attached to the towing vehicle adjacent the vehicle hitch. A portion of the cable is then slipped around the pulley and guide assembly and any excess slack in the cable is taken up by operation of the winch. Then, as the winch continues to be operated, the trailer tongue and vehicle hitch are brought together sufficiently close to permit the connection to be completed to U.S. Pat. No. 5,048,854 discloses a winch-driven hitch for coupling trailers to tow vehicles. The system comprises a unitary frame pivotally mounted beneath the bumper of the vehicle by a rigid pivot shaft, which projects upwardly from the center of the frame. A rigid base defines a tubular cavity and a platform for mounting a winch adjacent of the cavity. The cavity slidably receives a rigid bar coupled to the trailer. Deflectors project angularly outwardly from the cavity to define a mouth for guiding the bar into alignment as it penetrates the mouth. The frame rotates in response to pressure applied by the cable when the trailer is drawn from either side of the tow vehicle. The bar comprises a tapered end, a locking orifice defined centrally through the bar, and an orificed end for receiving a trailer connector. A rigid travel-limiting stop projects upwardly between the locking orifice and the orificed end. The stop limits travel of the bar relative to the mouth to assure proper coupling. The frame pivots roughly sixty-five degrees relative to the longitudinal axis of the cavity. Rotation of the frame is limited by a rigid stop projecting upwardly from the frame. The winch cable is anchored by a hand-tied knot to facilitate repair if broken. A drop pin and a cotter pin assembly are provided to assure safe coupling and to prevent frame rotation during travel. Electrical controls for the winch are mounted remote from the hitching zone.

U.S. Pat. No. 5,009,445 discloses a winching mechanism detachably secured to the forward end of the tongue of a trailer. In a first embodiment, a slip nut on a crank operated vertical threaded drive shaft is attached to one end of a cable, the opposite end of which is fitted with a snap hook which can be secured to a ball mount. The cable passes around a pulley at the base of a tubular housing in which the threaded shaft and slip nut are mounted. The pulley is located below the tongue. The cable is provided with a hook which is connected to a ball mount and when the drive shaft is driven by the crank causes the front of the trailer to be lifted and drawn to the towing vehicle for connection of the ball socket to the ball on the ball mount. In a second embodiment, the cable is wound on a crank operated drum and is fed to a pulley located below the tongue in a tubular housing of shorter length than employed in the first embodiment.

U.S. Pat. No. 5,005,852 discloses a trailer tongue communicating with a having first and second assemblies united by a winching apparatus. The first assembly is a housing integral with a handle and a coupler. A bracket, spring return brace, rod stop and pulleys are within the housing. The brace supports the first assembly such that the second assembly can be pulled, lifted, aligned and united therewith. The second assembly has bifurcated bars sandwiching blocks. The blocks have longitudinally aligned apertures having a pull, lift, align rod slidingly disposed through the apertures. One end of a winch cable is attached at a tapered forward end of the rod. The cable now extends to and trains about the first assembly pulleys, the cable returning through an aperture at the tapered forward end of the rod, continuing to extend to a winching apparatus. Winching the cable pulls, lifts, and aligns this second assembly rod until the tapered forward most end thereof abuts the first assembly stop, at which time continued winching results in the bifurcated bars being received into the housing as the rod is forced rearward.

U.S. Pat. No. 4,807,899 discloses a hitch assembly for use with a tow vehicle. The hitch assembly includes a receiver defining a tubular passage mounted on the rear of the tow vehicle, a winch extending a retractable cable rearward through said passage, and a hitch bar connectable to the end of the cable as well as to the hitch fixture of the towed element. The cable can be retracted to draw the hitch bar up within the receiver passage way with the towed element aligned and the hitch connection locked.

U.S. Pat. No. 2,435,255 discloses a hand operated brake adapted for use with a wagon. In the apparatus shown, the brakes are mounted on a rearward extension of the struts supporting the rear axle. The brakes are actuated by depressing the steering lever to pivot the levers by means of the saddle bar. To prevent application of the brakes, the saddle bar is pivotable towards the front in relation to the levers and downwardly so that it is clear of the handle.

U.S. Pat. No. 1,020,851 discloses a wagon brake. An upper cross beam has hangers secured to its ends. The hangers have a lower cross bar secured to their lower end. On the ends of the upper cross bar are hooks engaging links adapted to engage hooks on the wagon box or smaller hooks on the frame of the hay rack. Fastening rods are secured to the axle. Threaded forward ends of the rods are inserted through apertures formed in the lower cross bars and have clamping nuts at their ends. The nuts are tightened against the opposite sides of the cross bar and hold the bar against forward or rearward movement. The brake shaft is maintained at a fixed distance from the wheels so that the stroke needed to bring the shoes against the wheels will remain constant.

U.S. Pat. No. 997,959 discloses a vehicle brake for use with a wagon. A wheel is shown, against which the rim or tire of which the brake is to be applied. As the vehicle body is progressively loaded, it sinks lower with reference to the wheel, carrying with it the brake and brake bar. A brake shoe having a limited pivotal movement relative to the brake bar is provided so the brake block may uniformly seat along its entire face upon the tire.

U.S. Pat. No. 954,229 discloses a wagon brake. As shown, forward movement of a lever causes a rearward movement of the lower end of a second lever, resulting in corresponding movement of the brake beam and engagement of the shoes against the wheels. This resistance does not affect the power transmission train, since an arch is held on the perch not only by bolts but also by apparatus which, bearing against the rear face of the perch, resists any forward pulling stress.

U.S. Pat. No. 896,391 discloses a wagon brake comprising a wagon body, rear wheels, brake heads, hanger arms, pull arms, a flexible draw connection, sheave blocks, a pulley block, a flexible pull connection, a sheave, and levers. The compound movement provided as shown provides for the brake heads to engage the wagon wheels with a minimum exertion is provided to the pull rope.

U.S. Pat. No. 645,158 discloses a vehicle wheel brake for use with a wagon. A pulley arrangement permits receipt of a chain cooperating with a brake beam, or bar, to distribute braking force to both rear wheels.

U.S. Pat. No. 564,669 discloses a vehicle brake for use with a wagon. As shown, a sliding brake-beam is formed by longitudinally disposed bars or strips connecting transverse cleats of a wagon-body. The cleats are also connected by a pair of guide rods, on which the brake bar or beam slides. The brake bar or beam is provided with perforations to receive the guide rods. The brake bar or beam is biased in a position off of the wheels by spiral springs, disposed on the rear portions of the guide-rods and interposed between the rear cleat and the sliding brake bar. The springs are adapted to throw the brake-shoes off the wheels when the brake is unlocked. A transversely-disposed brake-lever is positioned intermediate of its ends to a suitable support of the wagon-body, the inner end of which is connected with the sliding brake bar or beam by a rod received through a perforation of the rear transverse cleat. Its ends are secured to the lever and to the brake beam or bar. The outer end of the brake lever is secured to the rear end of a longitudinally-disposed cable, arranged at one side of the wagon body and extending forward to the brake operating mechanism.

U.S. Patent Application No. 2007/0108731 discloses a system for positioning a towed vehicle relative to a towing vehicle. The system provides a cable extending from a spool to the tip of the boom and over a pulley, a mounting plate secured to a portion of the drop ball hitch, a cable end looped and secured to a hook, a drop ball hitch, a trailer tongue coupler, a tow ball, and a connector in the form of a hook eye secured to the coupler. The position of the connector is set so that, when the hook is engaged with the connector and the cable is wound onto the spool so that the trailer tongue is raised off of the ground, the mounting plate can be pivoted or rotated to a position where the connector is aligned with the with the tow ball 36.

PCT Patent Application No. WO 9317886 discloses a towbar coupling guide assembly mounted on a vehicle tow bar or a trailer drawbar. A winch assembly is provided on the other of the vehicle tow bar or trailer drawbar. The tow bar coupling guide assembly has a triangular or V-shaped base with a series of pulley wheels mounted thereon. The cable from the winch assembly is passed over the pulley wheels and its free end is hooked to an eye adjacent the winch assembly. The winch is then operated to wind in the cable to draw the vehicle tow bar or trailer draw bar toward the other of the vehicle tow bar or trailer drawbar.

Thus, a problem associated with devices that precede the present disclosure is that they do not provide the combination of features yielding the advantages of usability without conventional towing, automatic guidance, prolonged life of towing parts and smoothness of operation, automatic braking and long-range towability.

Yet another problem associated with devices that precede the present disclosure is that they do not provide a mechanism that self guides the vehicle to be towed toward the tow vehicle while pulled in a non-conventional fashion and also provides the other features and advantages described.

Still a further problem associated with devices that precede the present disclosure is that they do not provide a mechanism that self guides toward the traditional hitch point while pulled so that it is more easily secured for conventional towing while also providing the other features and advantages described.

An additional problem associated with devices that precede the present disclosure is that they do not provide apparatus that buffers the jerking forces during startup of pulling to provide smoother movement of a trailer and also provide prolonged life of the parts operative to pull the trailer toward the tow vehicle, while also providing the other features and advantages described.

Another problem associated with devices that precede the present disclosure is that they do not provide apparatus that automatically stops when not being pulled, thereby permitting an operator to work at other tasks during operation of the apparatus, while also providing the other features and advantages described.

An even further problem associated with devices that precede the present disclosure is that they do not provide apparatus that can be towed in the conventional fashion without brake engagement to facilitate longer range movement from point to point, while at the same time also providing the other features and advantages described.

There is a demand, therefore, for a vehicle that offers the combination of features yielding the advantages of usability without conventional towing, automatic guidance, prolonged life of towing parts and smoothness of operation, automatic braking and long-range towability.

SUMMARY OF THE INVENTION

In a most preferred embodiment, a trailer is provided with a guidance subassembly to facilitate pulling the trailer behind a tow vehicle. The trailer is provided with a dampening subassembly to absorb some of the shock of sudden movement of the tow vehicle relative to the trailer, to avoid undue wear and tear on the system components. The trailer is yet further provided with a biased-on braking subassembly so that the trailer can be left relatively unattended or moved reliably to interval positions behind the tow vehicle without risk of unintended movement. In this fashion, the trailer can be towed for discrete intervals without hitching it to the tow vehicle in the conventional fashion, and left relatively unattended during such movement. The trailer subassembly is further provided with a brake release to permit maintaining the biased-on brake subassembly in a released position. In this fashion, the trailer can be towed in the conventional fashion without fear that the brake subassembly will be engaged, thus impeding towing.

Thus, it is an object of the present disclosure to provide the combination of features yielding the advantages of usability without conventional towing, automatic guidance, prolonged life of towing parts and smoothness of operation, automatic braking and long-range towability.

Yet another object of the present disclosure is to provide a mechanism that self guides the vehicle to be towed toward the tow vehicle while pulled in a non-conventional fashion and also provides the other features and advantages described.

Still a further object of the present disclosure is to provide a mechanism that self guides toward the traditional hitch point while pulled so that it is more easily secured for conventional towing while also providing the other features and advantages described.

An additional object of the present disclosure is to provide apparatus that buffers the jerking forces during startup of pulling to provide smoother movement of a trailer and also provide prolonged life of the parts operative to pull the trailer toward the tow vehicle, while also providing the other features and advantages described.

Another object of the present disclosure is to provide apparatus that automatically stops when not being pulled, thereby permitting an operator to work at other tasks during operation of the apparatus, while also providing the other features and advantages described.

An even further object of the present disclosure is to provide apparatus that can be towed in the conventional fashion without brake engagement to facilitate longer range movement from point to point, while at the same time also providing the other features and advantages described.

There is a demand, therefore, for a vehicle that offers the combination of features yielding the advantages of usability without conventional towing, automatic guidance, prolonged life of towing parts and smoothness of operation, automatic braking and long-range towability.

BRIEF DESCRIPTION OF THE DRAWINGS

In the detailed description that follows, reference will be made to the following figures.

DETAILED DESCRIPTION OF PREFERRED EMBODIMENTS

Figure 1:
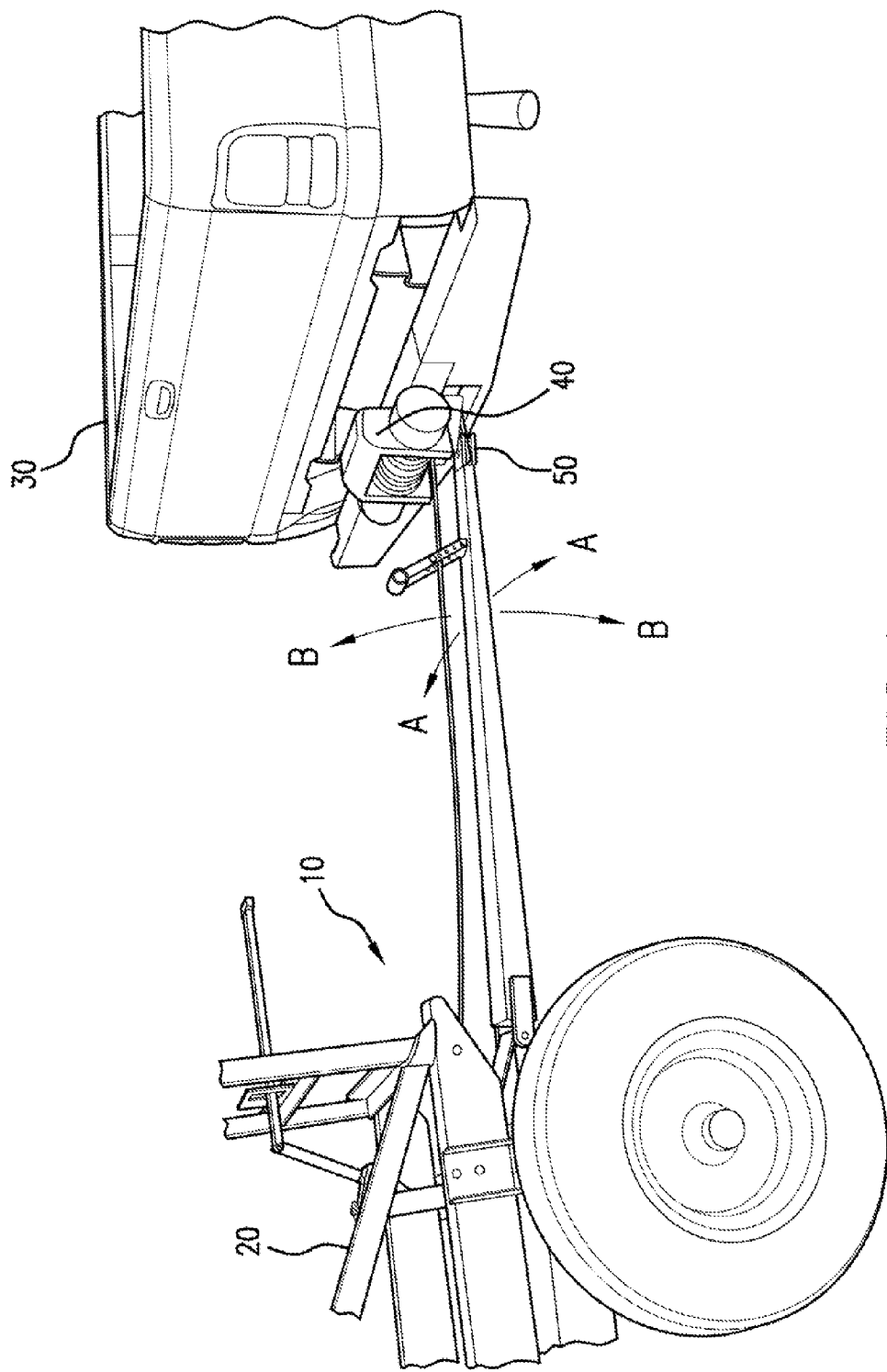
FIG. 1 is a perspective view of a portion of a preferred embodiment.

As shown in FIG. 1, an apparatus 10 for controlling movement of a four-wheel trailer 20 to permit pulling it behind a tow vehicle 30 is disclosed. Mechanical subassemblies 100, 200, 300, 400 and 500 (FIG. 2) can be combined to provide a trailer 20 that can be either guided to a tow vehicle 30 by a winch 40 or simply pulled along behind a tow vehicle 30 at intervals. If provided, the winch 40 is mounted on the back of the tow vehicle 30, and centrally located thereon, positioned a few inches above a trailer hitch connection point 50, provided either by a pin aperture or a tow ball.

Thus, the apparatus 10 is constructed and arranged to facilitate guidance to lead the trailer drawbar to the tow vehicle for hitching in a conventional fashion, and is also constructed and arranged to provide a safe, convenient, hands-off approach to pulling the trailer 20 behind the tow vehicle 30 from one position in the field to another without hitching the drawbar to the tow vehicle.

Figure 2:
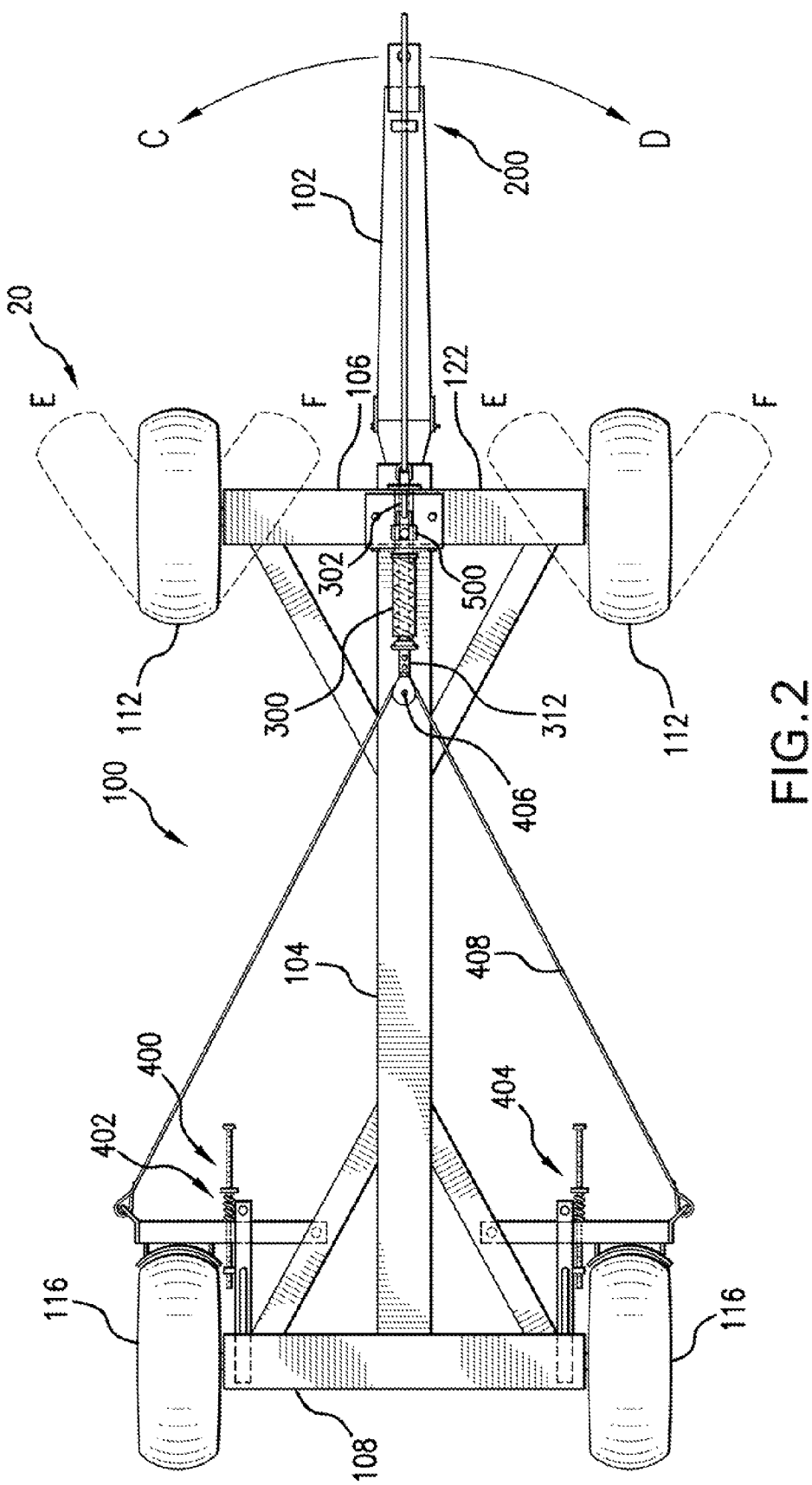
FIG. 2 is a top plan view of a portion of a preferred embodiment.

Referring now to FIG. 2, in a most preferred embodiment, the trailer 100 subassembly is provided with a guidance subassembly 200 to facilitate the guidance as described above. The trailer subassembly 100 is further provided with a dampening subassembly 300 to absorb some of the shock of sudden movement of the tow vehicle 30 relative to the trailer, to avoid undue wear and tear on the system components. The trailer subassembly 100 is yet further provided with a biased-on braking subassembly 400 so that the trailer 20 can be left relatively unattended or moved reliably to interval positions behind the tow vehicle 30 without risk of unintended movement. In this fashion, the trailer 20 can be towed for discrete intervals without connecting it to the tow vehicle 30, and left relatively unattended during such movement. The trailer subassembly 100 is further provided with a brake release securement subassembly 500 to permit maintaining the biased-on brake subassembly 400 in a released position. In this fashion, the trailer 20 can be towed without fear that the brake subassembly will be engaged, thus impeding towing.

Trailer Guide

Figure 4:
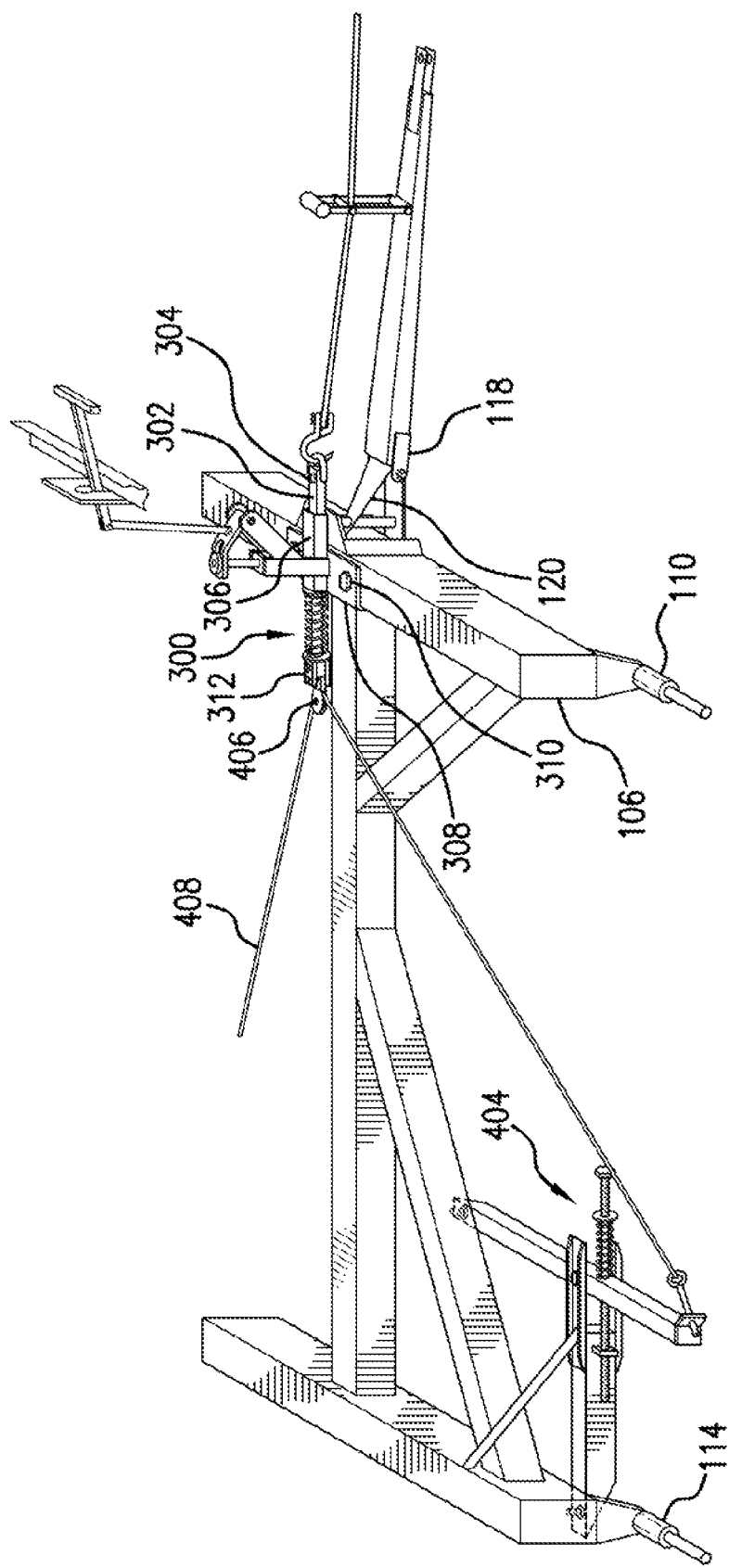
FIG. 4 is a perspective view of a portion of the preferred embodiment.

FIGS. 2 and 4 show an overhead view of a cutaway of the trailer subassembly 100 illustrating a portion of the operative subassemblies. The trailer drawbar 102 is provided with a guide subassembly 200 that, as explained below, facilitates movement of the trailer 20 so that it will follow a tow vehicle 30 even when not hitched to it in the conventional fashion. The trailer subassembly 100 includes a drawbar 102, frame 104, front wheel running gear assembly 106 and a back wheel running gear assembly 108. The front wheel running gear assembly 106 includes front wheel spindles 110 (shown in FIG. 4), upon which front wheels 112 are mounted. The rear wheel running gear assembly 108 includes rear wheel spindles 114 (shown in FIG. 4), upon which rear wheels 116 are mounted.

The drawbar 102 is mounted to the trailer subassembly 100 by vertically pivotal linkage 118, and is thereby pivotally connected to the running gear frame 122 along a first horizontal axis A-A (FIG. 1) and is vertically pivotable from a first position resting on the ground to a second position above the ground, as shown by the notation B-B (FIG. 1). As shown in FIG. 2, the drawbar 102 is attached to horizontal steering linkage 120 communicating with the front wheels 112 such that horizontal, or lateral, movement of the drawbar 102 along an arc from a first position C to a second position D effects movement of the front wheels from a first horizontal position E to a second horizontal position F. In this manner, movement of the drawbar 102 effects steering the directional movement of the trailer 20.

Figure 7:
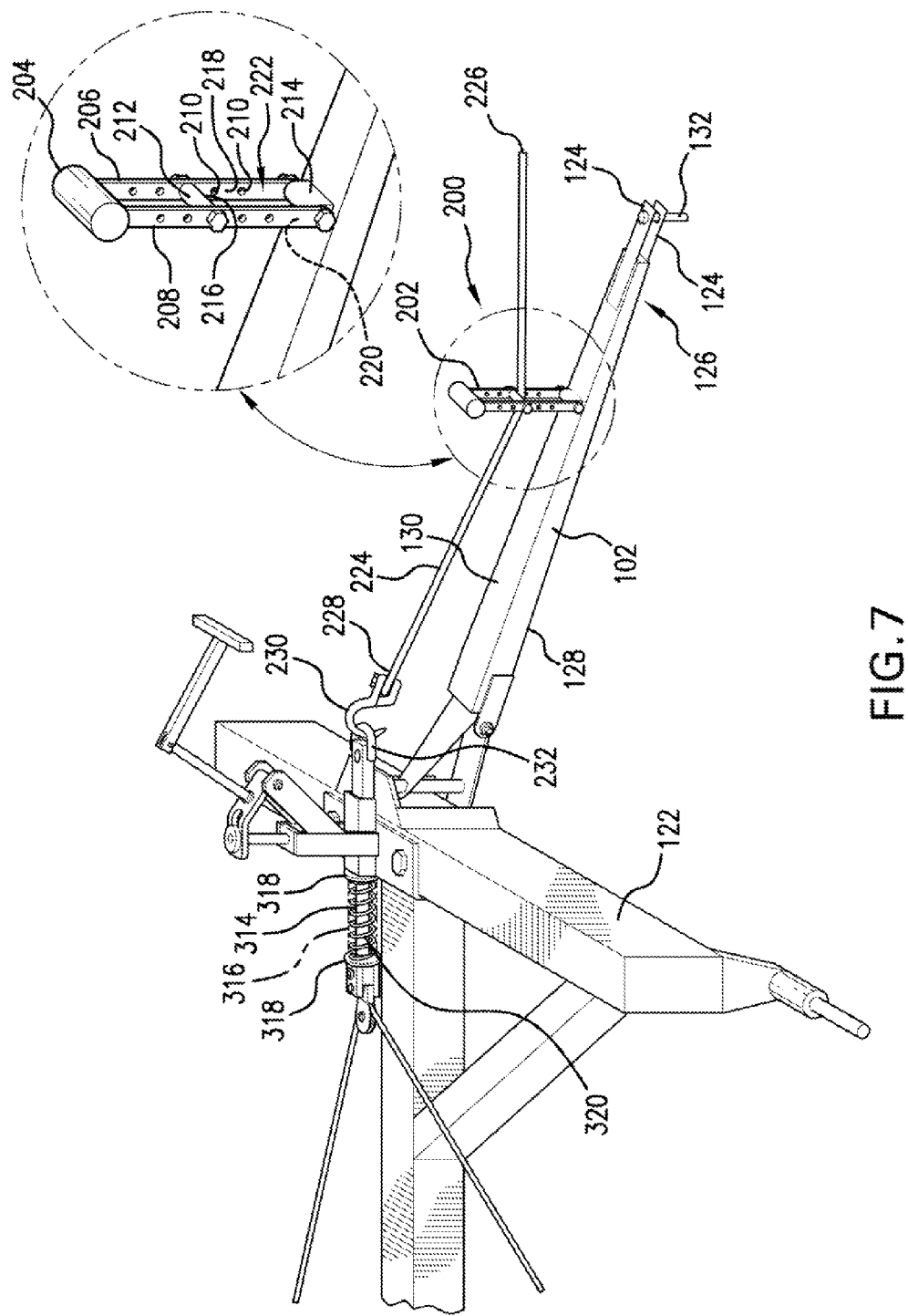
FIG. 7 is a perspective view of the portion of the illustration shown in FIG. 6.

Referring now to FIG. 7, the distal end 126 of the drawbar 102 is disposed toward the tow vehicle 30 (shown in FIG. 1). The proximal end 128 of the drawbar 102 is disposed toward the running gear frame 122. The drawbar 102 preferably has a flattened top surface 130. The drawbar is provided with tow pin receiving apertures 124 that are arranged to receive a pin or bolt 132 to secure the trailer 20 to the tow vehicle 30.

As shown in FIG. 7, a guidance subassembly 200 is provided. A guide bar 202 is mounted on the top surface 130 of the drawbar 102. For a typical drawbar length of six feet, the guide bar 202 is mounted about one foot behind the drawbar distal end 126 and on the top surface 130 of the drawbar 102. The guide bar 202 has a guide bar handle 204 extending across the top of the guide bar 202, a left bracket 206 and a right bracket 208 extending vertically from the guide bar handle 204 to the drawbar 102. Each bracket 206, 208 is provided with a plurality of vertical adjustability holes 210 through which a guide bar sleeve 212 can be mounted. Thus, the sleeve 212 is mounted on the brackets 206, 208 so as to be generally parallel to the guide bar handle 206, and the adjustability holes 210 provide a multiplicity of mounting locations for the sleeve 212 so as to provide multiple locations therefor relative to the top surface 130 of the drawbar 102. The guide bar 202 is connected to the drawbar 102 by a connection bushing 214 or, in the alternative, by welding.

As thus constructed and arranged, the guide bar subassembly 200 has an upper contact surface 216, a left contact portion 218 and a right contact portion 220, the contact portions defining a cable passage aperture 222. The cable passage aperture 222 receives a cable 224 extending from the tow vehicle 30. The cable 224 is provided to connect the trailer 20 to the tow vehicle 30.

At opposite ends thereof, the cable 224 has a vehicle terminus 226 and a trailer terminus 228. A cable securement hook 230 is secured to the trailer terminus 228 of the cable 224, and a cable hook receiving aperture 232 is provided on the trailer subassembly 100.

In a most preferred embodiment, the cable 224 extends from a winch 40 mounted on the tow vehicle 30, is threaded through the cable passage aperture 222 of the guidance subassembly 200, and extends toward the trailer 20. The cable hook 230 is positioned in the cable hook receiving aperture 232. As slack is removed from the cable 224, either by rotation of the winch 40 or movement of the tow vehicle 30, tension builds on the cable 224 sufficient to urge it in contact with the guide bar 202. Contact of the cable 224 with the upper contact surface 216 will urge movement of the drawbar 102 upward, contact of the cable 224 with the left contact surface 218 will urge movement of the drawbar 102 to the left, and contact of the cable 224 with the right contact surface 220 will urge movement of the drawbar 102 to the right. This contact moves the trailer drawbar 102 toward the hitch connection point 50 on the tow vehicle 30 and urges the trailer 20 to move toward the hitch connection point 50 on the tow vehicle 30. The contact also urges the drawbar upward to the correct height for connection to the hitch connection point 50 on the tow vehicle 30.

Thus, to use the apparatus 10 to couple the trailer 20 to the tow vehicle 30 in the conventional fashion, either the tow vehicle 30 or the winch 40 pulls the cable 224, movement of the cable 224 orients the drawbar toward the vehicle 30 and lifts the drawbar 102 to the correct pin height for vehicle attachment via a tow pin 132 (shown in FIG. 7). It is to be understood that a coupler and trailer ball assembly could be provided as an alternative.

To use the apparatus 10 to pull the trailer 20 behind the tow vehicle 30 without coupling it in the conventional fashion, the cable 224 is attached to the trailer 20 by the hook 230. When the cable 224 is sufficiently slack, the drawbar 102 rests on the ground. The contact between the trailer drawbar 102 and the ground biases the trailer 20 to stop moving. When the cable 224 is more taut, the drawbar 102 lifted off the ground, and the trailer 20 is no longer biased to stop moving. Tension on the cable 224 urges the trailer forward toward the vehicle 30 or winch 40. This tension on the cable 224 causes it to contact the upper contact surface 216 of the cable receiving passage 222 and exert an upward force thereon, urging the drawbar 102 upward. By lifting the drawbar 102 off the ground, the trailer 20 is free to roll forward toward the tow vehicle.

As can also be seen in FIG. 7, if the trailer drawbar 102 is not pointing toward the tow vehicle 30 or winch 40, tension on the cable 224 causes it to contact a side contact surface 218 or 220 of the cable receiving passage 222 and exert an sideward force, causing movement of the drawbar 102 sideways and orienting the drawbar 102 toward the direction of the vehicle 30 or winch 40. By moving the distal end 126 of the drawbar 102 toward the direction of the vehicle 30 or winch 40, the trailer 20 is urged to change directions and move more directly toward the vehicle 30 or winch 40 as it moves forward. Thus, lateral movement of the truck 30 or winch 40, or of the trailer 20 relative thereto, causes the cable 224 to urge against a side contact surface 218 or 220, steering the drawbar 102 in the direction of the truck 30 or winch 40 and correcting the movement of the trailer 20 relative thereto.

This, in a general sense, illustrates an example of a trailer comprising a frame, a pair of front wheels, a pair of rear wheels and a drawbar having a proximal end and a distal end. The proximal end is pivotally connected to the trailer along a first horizontal axis, so that the drawbar distal end is movable from a first vertical position resting on the ground to a second vertical position above the ground. The drawbar is steerably connected to the front wheels, so that lateral movement of the distal end of the drawbar moves the front wheels to effect steering of the trailer. A guide bar is mounted on the drawbar and is provided with an upper contact portion, a left contact portion and a right contact portion. These contact portions define a cable passage aperture for receiving a tow cable extending from a tow vehicle and secured to the trailer at a tow cable securement terminus. When tension is applied to the tow cable, e.g. by operating a winch or by moving the tow vehicle away from the trailer, the tension urges the cable in contact with at least one contact portion, thereby moving the drawbar and urging the trailer toward the tow vehicle.

Spring Dampener

In an even more preferred embodiment, a spring dampener subassembly 300 is provided. Mounted on the trailer frame 104, the spring dampener subassembly 300 dampens the impact force exerted by the winch cable 224 during movement of the tow vehicle 30 or winch 40 relative to the trailer 20.

Referring now to FIGS. 4 and 7, the cable hook 230 is received within the cable hook securement aperture 232. In this embodiment, the securement aperture 232 is affixed to slide bar 302 and positioned at its forward terminus 304. Slide bar 302 is received and contained within guide sleeve 306 which is mounted to angle iron bracket 308 constructed and arranged to be mountable on the front running gear assembly 106 and securable thereon by two mounting bolts 310. The guide sleeve 306 is further constructed and arranged to guide the slide bar 302. The slide bar 302 is provided with a rear terminus 312.

The slide bar 302 passes through a pipe sleeve spring compression cylinder 314 comprising a spring pipe sleeve 316 and two flat washers 318 disposed at opposite ends of the sleeve 316. Compression spring 320 is contained within the cylinder 314. The cylinder 314 is constructed and arranged to guide the compression spring 320 and to provide a positive stop for the compression spring 320 when compressed.

The slide bar 302 is operatively associated with the compression spring 316 so that movement of the slide bar 302 forward, toward the tow vehicle 30 or winch 40, effects compression on the spring 316. If no brake assembly 400 was provided, the slide bar rear terminus 312 would be fixed to the trailer frame 104. An elongated pin-receiving lockout aperture 322 (shown in FIG. 6) can be provided for use with a brake release securement subassembly 500, as discussed below.

Accordingly, the dampening subassembly 300 described above is constructed and arranged to moderate forces transmitted from the cable 224 to the trailer 20. This smoothes the trailer's movement and extends the life of the cable 224 and other parts associated with the trailer subassembly 100.

This, in a general sense, illustrates an example of a spring dampener subassembly having a guide sleeve attached to the trailer, a slide bar slidably received within the guide sleeve that is slidable from a retracted position to an extended position, and a spring in communication with the trailer and the slide bar, whereby the slide bar is springably attached to the trailer and biased toward the retracted position. The slide bar is maintained in communication with the tow cable securement terminus. When tension is applied to the tow cable, e.g. by operating the winch or by moving the tow vehicle away from the trailer, the tension urges the slide bar toward the extended position.

Biased-on Wheel Brake

In a yet more preferred embodiment, a biased-on brake subassembly 400 is provided. As shown in FIG. 2, a pair of rear wheel brake assemblies 402, 404 cooperates with the dampening subassembly 300 to provide a brake assembly 400 that is biased to brake the rear wheels 116 when the trailer 20 is not being pulled by the cable 224 but is automatically released when the trailer 20 is being pulled by the cable 224.

In this embodiment, a brake force distribution pulley 406 is attached to the rearward terminus 312 of the slide bar 302. A brake cable 408 extends from one of the rear wheel brake assemblies 402, passes through the brake force distribution pulley 406 and terminates at the other rear wheel brake assembly 404.

Figure 5:
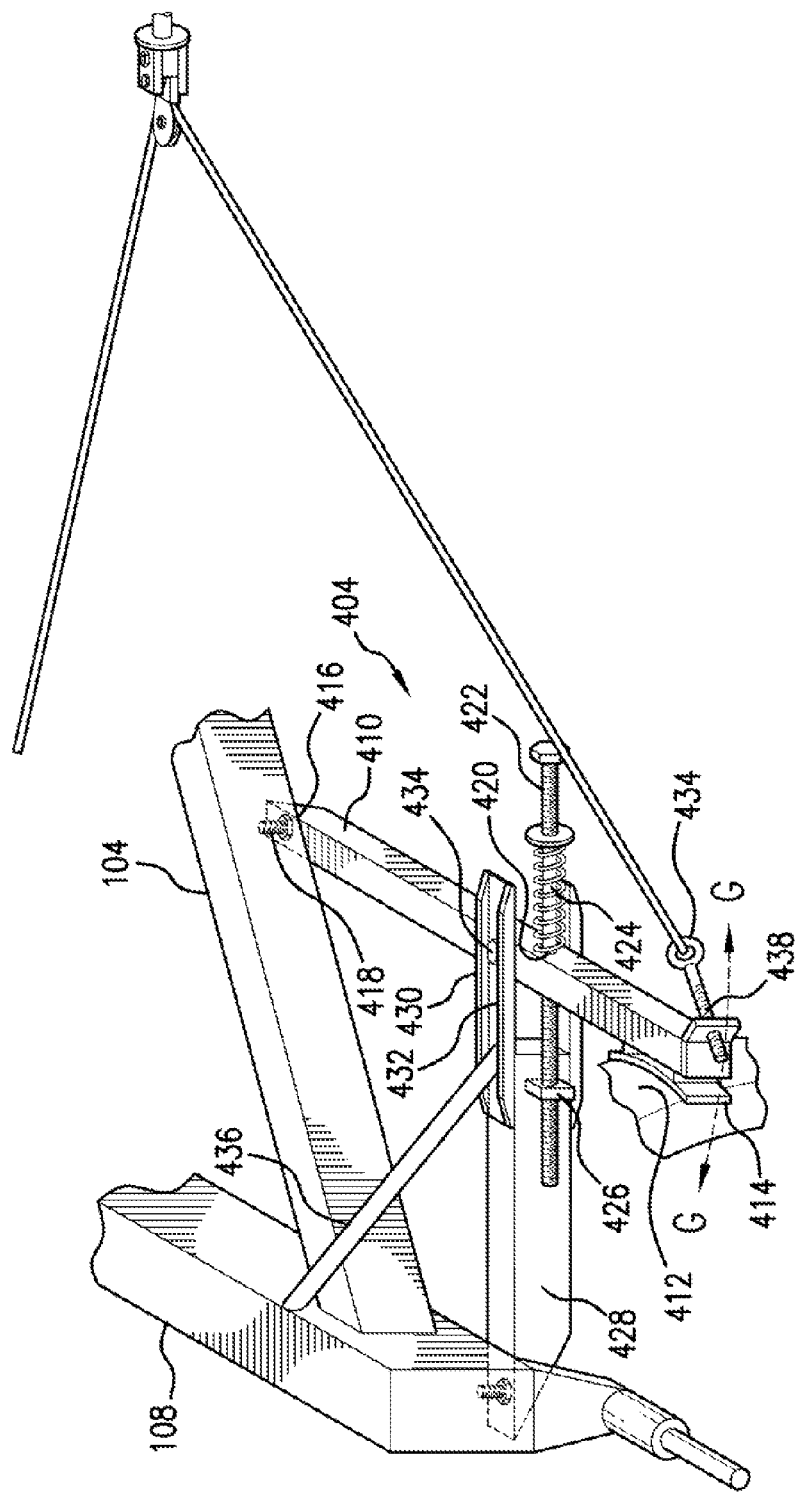
FIG. 5 is a cut-away view of a portion of a preferred embodiment.

Referring now to FIGS. 4 and 5, the position of the components discussed in the preceding paragraph is illustrated in more detail. The brake force distribution pulley 406 is arranged to receive the brake cable 408 that extends rearwardly therefrom toward each brake assembly 402, 404. By arranging the cable 408 to pass through the pulley 406, a force exerted by the cable 224 extending from the trailer 20 is generally equally distributed to each of the two brake assemblies 402, 404. These brakes 402, 404 act on the rear wheels 116 of the trailer subassembly 100.

FIG. 5 shows a cutaway view of the right rear brake assembly 404. Cable 408 passing through the pulley 406 is shown connected to a brake actuation arm 410. The actuation arm 410 is provided with a curved tire engagement surface 412 that, when forced against the tire outer surface 414, provides braking for the trailer subassembly 100. The curved tire engagement surface 412 can be provided with a supplemental brake shoe, if parts replaceability is desired.

As further shown in FIG. 5, looking at the right rear brake assembly 404 in greater detail, the bias of the brake assemblies 404 is provided by biased moveability of the actuation arm 410. The actuation arm 410 is pivotally mounted to the trailer frame 104 at pivot point aperture 416 and secured by pivot bolt 418. Bolt passage aperture 420 positioned on the actuation arm 410 provides passage for a threaded pivot bolt 422 with spring over bolt 424 disposed therearound. This bolt 422 passes through the bolt passage aperture 420 and threads into mounting bracket 426 mounted on the actuation arm guide bracket 428.

Figure 3:
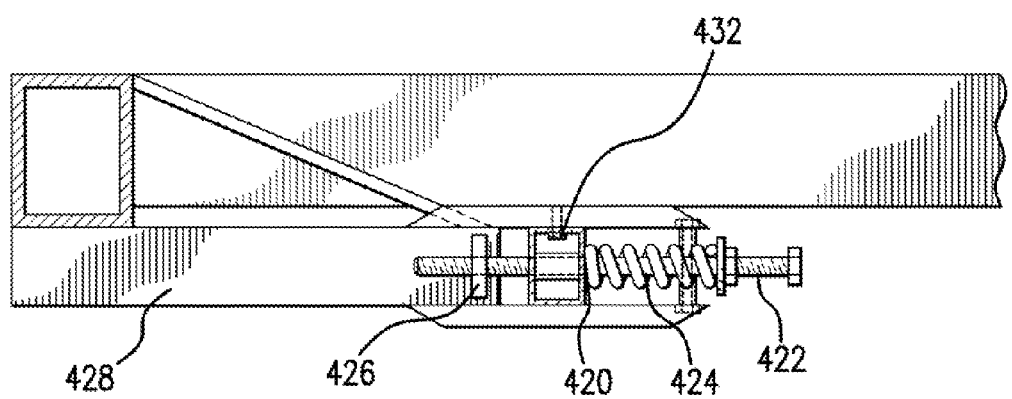
FIG. 3 is a side view of an isolated component of the portion of the preferred embodiment illustrated in FIG. 2.

Guide sleeve 430 is provided with an elongated guide bolt passage 432 (FIG. 3) constructed and arranged to permit a guide bolt 434 to be received therethrough. The bolt 434 is threadably secured in the actuation arm 410 but not tightened down completely, so as to cooperate with the guide bolt passage 432 to provide additional guidance for the actuation arm 410 to pivot within the substantially horizontal plan. An actuation arm support guide 436 mounts through the actuation arm guide sleeve 430 to the actuation arm guide bracket 428 and extends therefrom to the rear running gear assembly 108 to provide yet additional support, particularly in resisting the downward force exerted by a moving tire on the actuation arm 410. Thus, the actuation arm is pivotable in a substantially horizontal plane G-G.

Spring over bolt 424 is held in compression and urges the actuation arm 410 backward, toward the tire. Thus, without any other force acting on the system, the brake is biased on. Note that the threaded bolt 424 provides adjustability, so that the force biasing the brake on can be adjusted.

The brake cable 408 is attached to the actuation arm 410 by a cable connector threaded eye bolt 438. Tension on the brake cable 408 will exert a forward force on the actuation arm 410, thereby pulling the arm forward and releasing the brake 404. Because the eye bolt 438 is threaded, the amount of play or slack in the brake force distribution cable is adjustable, so that the engagement point of the brake release assembly can be changed.

The left rear brake assembly 402 is constructed identically. As thus constructed, a pulling force on the tow cable 224 exerted by the tow vehicle 30 or the winch 40 will be dampened, but will nonetheless urge the slide bar 302 forward. This movement will move the brake force distribution pulley 406 forward and provide additional tension on the brake cable 408, thereby moving the actuation arms 410 (left and right) forward and releasing the brake. An additional safety feature of this arrangement is that if the brake cable 408 or the tow cable 224 should break, the brake assemblies 402 and 404 are biased on and the trailer 20 will stop or be slowed.

As can be seen, the brake spring force is adjustable. So also is the cable engagement position adjustable. Additionally, the provision of a stabilization bar prevents the tire from driving the brake downward and extends its service life. The cable cooperates with a pair of biased-on brake subassemblies is provided to brake the rear wheels of the trailer, thereby preventing unwanted movement of the trailer when tension is released by the winch cable. The brake distribution pulley assists in distributing cable tension somewhat equally, so as to effect an equal brake release of the rear wheels when tension is placed on the cable.

This, in a general sense, illustrates an example of a biased-on brake subassembly having a brake actuator connected to the trailer. The brake actuator has a tire engagement surface associated with it, and is moveable from an engaged position, in which the tire engagement surface is positioned in contact with a trailer tire, to a released position, whereby the tire engagement surface is positioned apart from the trailer tire. The brake actuator is biased in the engaged position and is operatively associated with the tow cable so that when tension is placed on the tow cable, e.g. by operating the winch or by moving the tow vehicle away from the trailer, the tension moves the brake actuator from the engaged position to the released position.

Brake Bias Release

Figure 6:
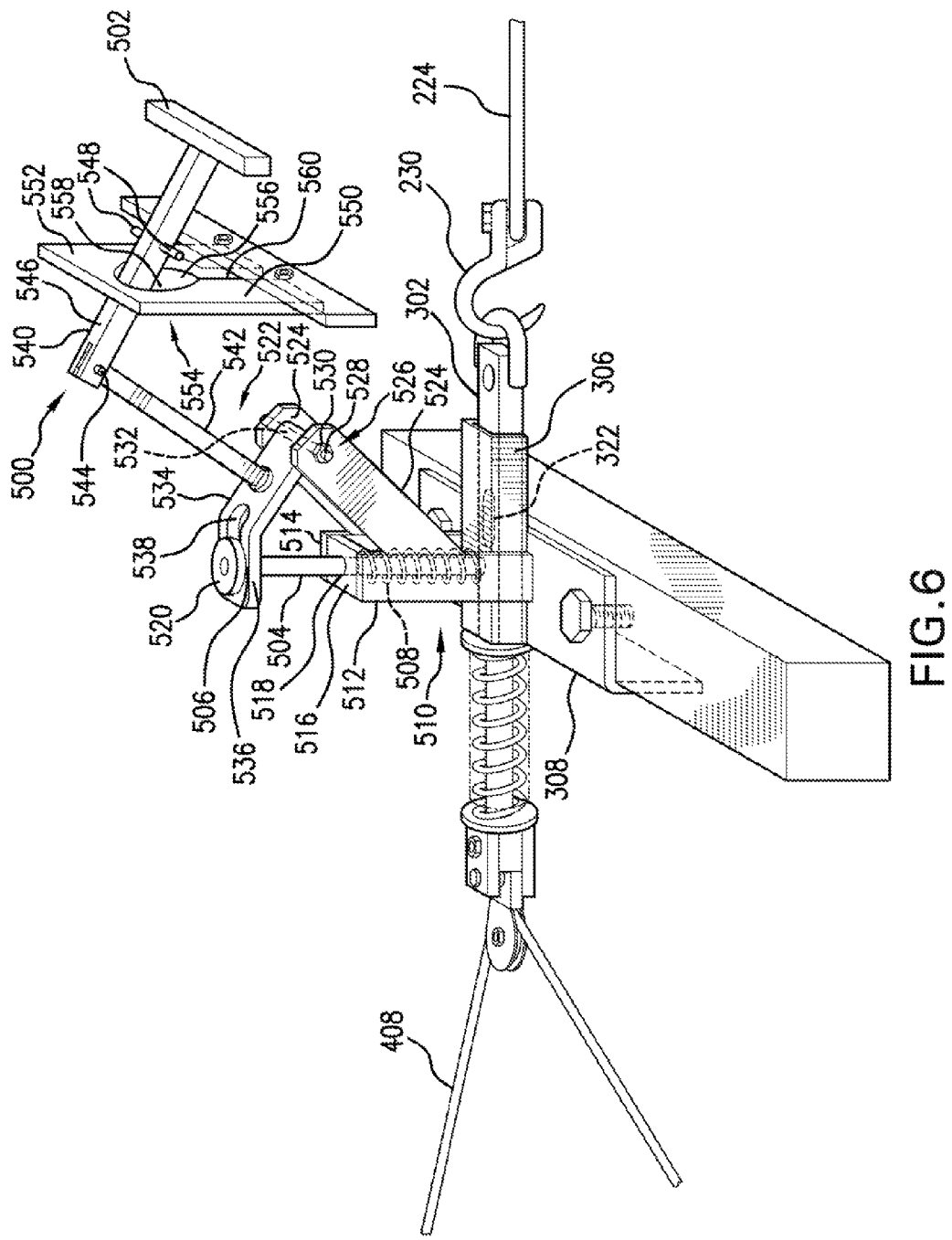
FIG. 6 is a perspective view of a subassembly of the preferred embodiment illustrating components thereof.

Referring now to FIG. 6, in a most preferred embodiment, a brake release securement subassembly 500 is provided that overcomes the biased-on configuration of the brake assemblies 402, 404 (shown in FIG. 2) so that the brakes can be disabled for towing. The brake release securement subassembly 500 is constructed and arranged to be settable so as to effect a fixed tension on the brake cable 408, thereby maintaining the biased-on brake assembly 400 in a brake-off position.

The brake release securement subassembly 500 includes a hand-set bar 502 operatively associated with a lockout pin 504 provided with a flattened head 506 at its top end. This structure permits the biased-on brake assembly 400 to be locked in a released position during towing or for any other reason desired, as described below.

A vertical compression spring 508 is provided within a vertical spring containment assembly 510. The spring 508 communicates with the lockout pin 504 so as to bias the lockout pin 504 downward. An aperture (not shown) on the top surface of the guide sleeve is sized to permit passage of the pin 504 therethrough The elongated lockout aperture 322 provided in the slide bar 302 is sized to permit passage of the pin 504 therethrough; by elongating the aperture 322, the pin 504 can be received within the aperture 322 while the slide bar is moving.

The vertical spring containment assembly 510 is constructed and arranged as follows. Vertical straps 512, 514 extend upward from the angle iron bracket 308 and are welded to opposite sides of the guide sleeve 306. A face plate 516 is welded between the upper portions of the straps 514 and provided with a pin aperture 518. A substantial portion of the lockout pin 504 is positioned inside the vertical compression spring 508; the upper portion of the lockout pin 504 passes through the pin aperture 518 and is movably secured by a flat washer 520 positioned proximate to the flattened head 506 of the lockout pin 504.

A brake release actuation subassembly 522 is provided. Angled brackets 524 extend upward and outward from the vertical straps 514 and are provided with holes 526 to receive a securement bolt 528 secured by a nut 530. Sleeved bushing 532 is positioned between the brackets 524 and secured therebetween by the bolt 528. An actuator arm 534 extends from the bushing 532 and has a flat terminus 536 provided with a pin-receiving slot 538 machined to an elongated configuration that provides slidable containment of the lockout pin 504. The lockout pin is positioned within the slot 538 such that the flat washer 520 is located on top of the slot 538. Accordingly, in cooperation with the angled brackets 524, the sleeved bushing 532 and the actuator arm 534, the lockout pin 504 is slidably secured in the slot 538 in a non-binding relation.

Additionally, a lockout arm assembly 540 is provided that communicates with the actuator arm 534 to move the lockout pin upward and in its secured position. The lockout arm assembly 540 comprises a first lockout arm portion 542 secured at one end to the actuator arm 534 and at its other end to a pivot assembly 544. The second lockout arm portion 546 is secured at one end to the pivot assembly 544 and at its other end to the hand-set bar 502. Positioned on the second lockout arm portion 546 proximate to the hand-set bar 502 is a pair of opposed set pins 548 extending outward and substantially perpendicular to the length of the second lockout arm portion 546.

A lockout bracket 550 has a front face 552 and a rear face 554, and is mounted to the trailer 20. The bracket 550 is provided with a keyhole-shaped opening 556 shaped with a circular upper portion 558 and a slot portion 560. The dimensions of the opening 556 and the opposed set pins 548 cooperate such that the opposed set pins 548 define an effective arm-portion width that is less than the width of the circular upper portion 558 of the opening 556 but greater than the width of the slot portion 560. The lockout arm assembly 540 is positioned so that the second lockout arm portion 546 passes through the opening 556 on the lockout bracket 550. In this fashion, when the hand-set bar 502 is raised, the opposed set pins 548 are positioned behind the rear face 554 of the bracket 550, thus permitting the lockout pin 504 to move downward and engage the lockout aperture 322. Conversely, the hand-set bar 502 can be pulled forward and lowered so that the opposed set pins 548 are positioned adjacent the front face 552 of the bracket 550; friction maintains the lockout arm in a position such that the lockout pin 504 is maintained in a raised position and the pin does not engage the lockout aperture 322.

The hand-set bar 502 is thereby constructed and arranged to be movable between a released position, in which movement of the pin 504 is not restricted and the pin 504 is biased to move downward, and a secured position, in which movement of the pin 504 is restricted and the pin is maintained in a upward position so that it does not extend through the lockout aperture 322. The lockout aperture 322 is positioned within the guide bar 302 so that, when the lockout pin extends through it, the guide bar 302 is in a forward position maintaining tension on the brake cable 408, thereby maintaining the brake assemblies 402, 404 in a released position.

This, in a general sense, illustrates an example of a brake bias lockout. A brake release bar is provided that is moveable between a released position and a lockout position. A brake release bar securement apparatus is constructed and arranged to secure the brake release bar in the lockout position. Communication linkage is provided that is operatively associated with the brake actuator and the brake release bar, whereby movement of the brake release bar to the released position does not influence the position of the brake actuator and whereby movement of the brake release bar to the lockout position urges the brake actuator to move to the released position.

In a more specific sense, the foregoing illustrates an example of an apparatus combining these features. A trailer having a frame, a pair of front wheels, a pair of rear wheels and a drawbar is shown. The drawbar has a proximal end and a distal end, and the proximal end is pivotally connected to the trailer along a first horizontal axis, whereby the drawbar distal end is movable from a first vertical position resting on the ground to a second vertical position above the ground.

The drawbar is steerably connected to the front wheels so that lateral movement of the distal end of the drawbar moves the front wheels to effect steering of the trailer. A guide bar is mounted on the drawbar and having an upper contact portion, a left contact portion and a right contact portion, the contact portions defining a cable passage aperture for receiving a tow cable extending from a tow vehicle and secured to the trailer at a tow cable receiving aperture provided on a forward terminus of a slide bar. Tension applied to the tow cable, e.g. by operating a winch or by moving the tow vehicle away from the trailer, urges the tow cable in contact with at least one contact portion, thereby moving the drawbar and urging the trailer toward the tow vehicle.

Additionally, a spring dampener subassembly comprising a guide sleeve attached to the trailer is provided. The slide bar further has a rearward terminus having a brake cable connecting pulley and a central portion having an elongated lockout pin-receiving aperture. The slide bar is slidably received within the guide sleeve and is slidable from a retracted position to an extended position. A spring in communication with the trailer and the slide bar is constructed and arranged so that the slide bar is springably attached to the trailer and biased toward the retracted position. Thus, tension applied to the tow cable urges the slide bar toward the extended position.

Even further, a biased-on brake subassembly comprising a brake cable received through the brake cable connecting pulley and connected to a left brake actuator and a right brake actuator is provided. The left brake actuator is connected to the trailer and has a tire engagement surface associated therewith, the left brake actuator being moveable from an engaged position, whereby the tire engagement surface is positioned in contact with a left trailer tire, and a released position, whereby the tire engagement surface is positioned apart from the left trailer tire. The left brake actuator is biased in the engaged position.

The right brake actuator is constructed in much the same way. The right brake actuator is connected to the trailer and has a tire engagement surface associated therewith, the right brake actuator being moveable from an engaged position, whereby the tire engagement surface is positioned in contact with a right trailer tire, and a released position, whereby the tire engagement surface is positioned apart from the right trailer tire. The right brake actuator is biased in the engaged position.

Tension on the tow cable moves the slide bar forward and places tension on the brake cable, whereby the brake cable moves the left and right brake actuators from the engaged position to the released position.

Even further, a settable brake bias lockout comprising a brake release bar moveable between a released position and a lockout position, a brake release bar securement apparatus constructed and arranged to secure the brake release bar in the lockout position and communication linkage operatively connecting the brake release bar to a lockout pin moveable from a released position, in which the lockout pin is maintained in spaced-apart relation to the elongated pin-receiving aperture of the slide bar so that the slide bar is free to move back and forth within the guide sleeve, to a locking position, in which the lockout pin is received within the elongated pin-receiving aperture of the slide bar, thereby preventing the slide bar from moving back and forth within the guide sleeve, is provided. The communication linkage constructed and arranged so that when the brake release bar is in the released position, the lockout pin is in the released position, and when the brake release bar is in the lockout position, the lockout pin is in the locking position. The lockout pin-receiving aperture being positioned in relation to the lockout pin so that when the lockout pin is in the locking position, the tension in the brake cable is sufficient to overcome the bias on the brake actuators and move the brake actuators to their released positions. Thus, movement of the brake release bar to the released position does not influence the position of the brake actuator and movement of the brake release bar to the lockout position urges the brake actuators to move to the released positions.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of the claims.

What is claimed is:

1. A trailer comprising:
a frame, a pair of front wheels, a pair of rear wheels and a drawbar;
the drawbar having a proximal end and a distal end;
the proximal end being pivotally connected to the trailer along a first horizontal axis, whereby the drawbar distal end is movable from a first vertical position resting on the ground to a second vertical position above the ground;
the drawbar being steerably connected to the front wheels, whereby lateral movement of the distal end of the drawbar moves the front wheels to effect steering of the trailer;
a guide bar mounted on the drawbar and having an upper contact portion, a left contact portion and a right contact portion, the contact portions defining a cable passage aperture for receiving a tow cable extending from a tow vehicle and secured to the trailer at a tow cable securement terminus;
whereby tension applied to the tow cable urges it in contact with at least one contact portion, thereby moving the drawbar and urging the trailer toward the tow vehicle
a spring dampener subassembly having a guide sleeve attached to the trailer; a slide bar slidably received within the guide sleeve and being slidable from a retracted position to an extended position; and a spring in communication with the trailer and the slide bar whereby the slide bar is springably attached to the trailer and biased toward the retracted position;
the slide bar being in communication with the tow cable securement terminus;
whereby tension applied to the tow cable urges the slide bar toward the extended position.

2. The trailer of claim 1, further having a biased-on brake subassembly comprising:
a brake actuator connected to the trailer and having a tire engagement surface associated therewith;
the brake actuator moveable from an engaged position, whereby the tire engagement surface is positioned in contact with a trailer tire, and a released position, whereby the tire engagement surface is positioned apart from the trailer tire, the brake actuator further being biased in the engaged position; and
the brake actuator being operatively associated with the tow cable such that tension on the tow cable moves the brake actuator from the engaged position to the released position.

3. The trailer of claim 2, further comprising a brake bias lockout comprising:
a brake release bar moveable between a released position and a lockout position;
a brake release bar securement apparatus constructed and arranged to secure the brake release bar in the lockout position;
communication linkage operatively associated with the brake actuator and the brake release bar whereby movement of the brake release bar to the released position does not influence the position of the brake actuator and whereby movement of the brake release bar to the lockout position urges the brake actuator to move to the released position.

4. A trailer comprising:
a frame, a pair of front wheels, a pair of rear wheels and a drawbar;
the drawbar having a proximal end and a distal end;
the proximal end being pivotally connected to the trailer along a first horizontal axis, whereby the drawbar distal end is movable from a first vertical position resting on the ground to a second vertical position above the ground;
the drawbar being steerably connected to the front wheels, whereby lateral movement of the distal end of the drawbar moves the front wheels to effect steering of the trailer;
a guide bar mounted on the drawbar and having an upper contact portion, a left contact portion and a right contact portion, the contact portions defining a cable passage aperture for receiving a tow cable extending from a tow vehicle and secured to the trailer at a tow cable receiving aperture provided on a forward terminus of a slide bar;
whereby tension applied to the tow cable urges it in contact with at least one contact portion, thereby moving the drawbar and urging the trailer toward the tow vehicle;
a spring dampener subassembly comprising a guide sleeve attached to the trailer;
the slide bar further having a rearward terminus having a brake cable connecting pulley, a central portion having an elongated lockout pin-receiving aperture and being slidably received within the guide sleeve;
the slide bar being slidable from a retracted position to an extended position, a spring in communication with the trailer and the slide bar whereby the slide bar is springably attached to the trailer and biased toward the retracted position;
whereby tension applied to the tow cable urges the slide bar toward the extended position;
a biased-on brake subassembly comprising a brake cable received through the brake cable connecting pulley and connected to a left brake actuator and a right brake actuator;
the left brake actuator connected to the trailer and having a tire engagement surface associated therewith, the left brake actuator moveable from an engaged position, whereby the tire engagement surface is positioned in contact with a left trailer tire, and a released position, whereby the tire engagement surface is positioned apart from the left trailer tire, the left brake actuator further being biased in the engaged position;
the right brake actuator connected to the trailer and having a tire engagement surface associated therewith, the right brake actuator moveable from an engaged position, whereby the tire engagement surface is positioned in contact with a right trailer tire, and a released position, whereby the tire engagement surface is positioned apart from the right trailer tire, the right brake actuator further being biased in the engaged position;
whereby tension on the tow cable moves the slide bar forward and places tension on the brake cable, whereby the brake cable moves the left and right brake actuators from the engaged position to the released position;
a settable brake bias lockout comprising a brake release bar moveable between a released position and a lockout position, a brake release bar securement apparatus constructed and arranged to secure the brake release bar in the lockout position;
communication linkage operatively connecting the brake release bar to a lockout pin moveable from a released position, in which the lockout pin is maintained in spaced-apart relation to the elongated pin-receiving aperture of the slide bar so that the slide bar is free to move back and forth within the guide sleeve, to a locking position, in which the lockout pin is received within the elongated pin-receiving aperture of the slide bar, thereby preventing the slide bar from moving back and forth within the guide sleeve;

the communication linkage constructed and arranged so that when the brake release bar is in the released position, the lockout pin is in the released position, and when the brake release bar is in the lockout position, the lockout pin is in the locking position;

the lockout pin-receiving aperture being positioned in relation to the lockout pin so that when the lockout pin is in the locking position, the tension in the brake cable is sufficient to overcome the bias on the brake actuators and move the brake actuators to their released positions;

whereby movement of the brake release bar to the released position does not influence the position of the brake actuator and movement of the brake release bar to the lockout position urges the brake actuators to move to the released positions.

* * * * *